Oct. 25, 1938.  E. P. SEGHERS  2,134,585

PERCOLATOR TOP

Filed Oct. 16, 1936

INVENTOR.
EMIEL P. SEGHERS
BY George H. Simmons
ATTORNEY.

Patented Oct. 25, 1938

2,134,585

UNITED STATES PATENT OFFICE 2,134,585

PERCOLATOR TOP

Emiel P. Seghers, Chicago, Ill.

Application October 16, 1936, Serial No. 105,861

18 Claims. (Cl. 53—3)

This invention relates to tops for percolators and the like and has for its principal object the provision of an improved top and arrangement for holding the same in the lid of a vessel.

It is a main object of the invention to provide a top adapted to receive a clip or retaining device which securely holds the top in the lid of the percolator.

A further object lies in the provision of an improved clip or retaining means which is securely fixed upon the top and arranged to securely fasten the top in the lid.

Further objects of the invention not specifically mentioned here will be apparent from the detailed description and claims which follow, reference being had to the accompanying drawing in which a preferred embodiment of the invention is shown by way of example and in which:

Percolators and similar vessels are usually provided with a transparent glass top that is fitted into a flanged opening in the lid of the vessel and held by a bayonet joint formed by lugs on the top co-operating with the flange of the lid. Usually the lids of percolators are composed of aluminum, which is relatively soft and which has a co-efficient of expansion that differs greatly from the coefficient expansion of glass and after the percolator has been used a short time the top becomes loose in the lid and is very apt to fall out and become broken.

In the prior art of which I am aware, numerous attempts have been made to provide a means for securely holding the top in the lid, even after the opening in the lid has been enlarged by alternate expansion and contraction of the top.

In my co-pending application, Serial No. 56,448, filed December 28, 1935, I disclose a spring clip adapted to be hooked over the bead of the percolator top and to extend around the open end thereof and into the hollowed out portion therein. The clip is tensioned to exert a pressure outwardly of the top and serves to securely bind the top in the lid. The present invention relates more specifically to an improvement upon the clip of my prior co-pending application and to a top especially designed for use therewith, and the present application is a continuation in part of said application.

Figure 1:
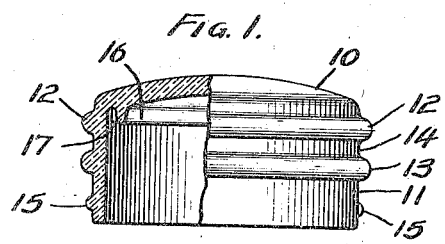
Figure 1 is an elevational view, partly in section, showing one form of the invention.

Referring now to the drawing in more detail, in Figure 1 there is shown a glass top consisting of a circular relatively flat closure portion 10 having a depending cylindrical apron 11 which is made in the form of an annulus to provide a hollowed out portion within the top. There is provided a bead 12 and a molding 13 which, between them, define the top and bottom sides of a groove 14 which encircles the top. Lugs 15 may be provided on the apron as before and serve to form a bayonet joint by which the top is secured upon the lid.

Within the hollowed out portion of the top there is provided a depending shoulder 16 which is spaced away from the inner wall of the apron to form therewith a groove 17 for a purpose which will presently appear. The top shown in Figure 1 is a smooth top with the closure portion 10 formed as a section of a sphere, and it will be understood that the usual ornamental knob or handle frequently provided on tops of this type may be included in the top shown in Figure 1 if desired.

Figures 2, 3:
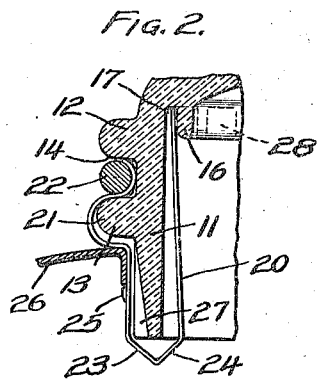
Figure 2 is a fragmentary cross-sectional view of a top showing one form of clip attached thereto.
Figure 3 is a fragmentary cross-sectional view of a top having a portion of the molding cut away and showing a modified form of clip used in conjunction therewith.
Figure 7:
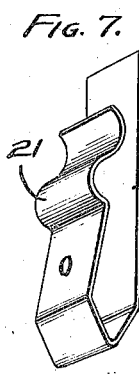
Figure 7 is a perspective view of a clip of the type shown in Figure 2.

Referring now to Figures 2 and 7, it will be seen that the clip 20 extends from the groove 14 around the open end of the apron 11 and into the hollowed out portion of the top where it is terminated in the groove 17 against the shoulder 16. The clip 20 has an arcuate portion 21 adapted to extend around the lower bead 13. A spring metal ring 22 is fitted in the groove 14 over the upper end of the clip 20 and serves to securely lock that end of the clip in the groove. The ring 22 is of such diameter that its outer surface is substantially flush with the outer surfaces of the molding and bead so that the end of the clip is protected and will not catch upon a tea towel when the percolator is being dried.

The clip 20 is of general U-shape and there is provided a pair of bevelled surfaces 23 and 24 which between them form a point located at the closed end of the clip. A boss 25 is provided between the surface 23 and the arcuate portion 21 and arranged so as to engage the free edge of the flanged portion of the lid 26 when the top is in registry therewith.

It will be noted that the inner end of the clip 20 is longer than the outer end and that the point of engagement of this end with the shoulder 16 of the top is above the ring 22. As a result of this construction, both ends of the clip are secured and the clip may be strongly tensioned outwardly and serves to securely bind the top in the lid and to take up the expansion and contraction of the top without loosening the same. A clip of this type may be provided in conjunction with the usual bayonet lugs 15 or, if desired, the lugs may be omitted and the clip relied upon to hold the top in place in the lid, thereby forming a snap-on construction.

In Figure 2, a lower end of the apron 11 is shown cut away at 27 to form a wedge shaped recess into which the spring clip 20 may be depressed when being registered with the flanged portion of the lid.

A wedge shaped recess of this type may be provided in any one of the tops shown in the drawing, within the teachings of the invention.

When used as a snap-on clip, it is desirable that the clip remain fixed with respect to the top, and to this end, in Figure 2, there is shown lug 28 extending from the shoulder 16 to the walls of the apron across the groove 17, this lug and others like it serving to divide the groove 17 into a plurality of pockets, each of which is adapted to receive and hold the end of the clip 20. As shown, the lug 28 extends to the free edge of the shoulder 16 but it will be apparent that a shorter lug may be provided if desired.

The top shown in Figure 3 is provided with an apron 11 and closure portion 10 and bead 12 as before, and the molding 13 is cut away to provide a socket through which the clip 30 is extended. Clip 30, shown in detail in Figure 8, has a hooklike upper portion 31 adapted to register in the groove 14 in the top and to receive the retaining ring 22. The clip is provided with an outwardly projecting boss 32 which is adapted to engage the underside of the lid or flange thereof, and is also provided with bevelled surfaces 33 and 34 which co-operate to guide the clip into the lid. Molding 13 may be omitted if desired in which case the ring 22 engages the upper surface of the lid and serves to position the top with respect thereto.

The top shown in Figure 3 is provided with inwardly extending lugs in lieu of the shoulder and groove shown in Figure 2, which lugs have a narrowed portion 35 adapted to receive the end of the spring 30, which is perforated at 36 so as to fit over the lug. The lug serves to lock this end of the spring against movement circumferentially and radially of the top.

The lid 38 shown in Figure 3 is thicker than the lid 26 and is not provided with a flange, this particular lid being shown to illustrate the application of the top to a porcelain lid.

It will be understood that a top of the type shown in Figure 3, that is one having a cut away portion in the molding, may also be provided with an inner shoulder and groove formed thereby in lieu of the lugs 35 within the teachings of the invention and that a top of the type shown in Figure 2 may be provided with lugs such as 35 in lieu of the shoulder and groove shown in this figure.

Figure 4:
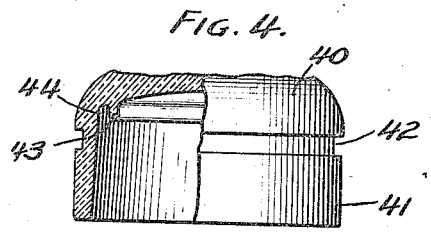
Figure 4 is a fragmentary elevational view, partly in section, showing a modified type of top.
Figure 5:
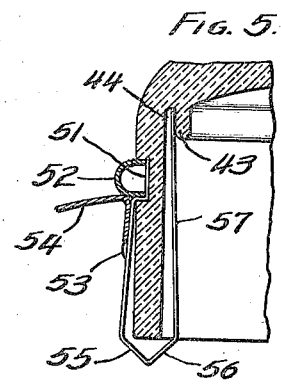
Figure 5 is a fragmentary cross-sectional view of the top shown in Figure 4, showing the clip and retaining means used in conjunction therewith.

In certain instances it may be advantageous to form a top without either a bead or a molding and to provide a metallic ring which serves as a bead and also serves to retain the spring clip on the top. In Figures 4 and 5 a top of this type is shown and consists of a closure portion 40 which may be provided with a knob or handle of the type usually used on percolator tops and omitted from the drawing to avoid an unnecessary complication thereof, and with an annular portion 41 which forms an apron. A groove 42 of generally rectangular cross-section encircles the top at or near the junction of the closure portion 40 with the apron 41. Within the hollowed out portion of the top there may be provided a shoulder 43 which is spaced away from the apron to form a groove 44 as before or lugs such as 35 may be provided in lieu thereof. Lugs such as 15, Figure 1, may be provided on the apron, if desired.

As will be seen in Figure 5, the clip adapted to be used in connection with a top of this type has an end portion 51 adapted to lie in the bottom of the groove 42 in the top where it is held by the ring 52. The clip is formed in the same manner as hereinbefore explained, that is, it has a boss 53 for engaging the lid of the flange 54 and flat surfaces 55 and 56 for guiding the clip into the lid. The inner arm 57 rests in the groove 44 against the shoulder 43 and serves to tension the clip outwardly of the lid.

The retaining ring 52 may conveniently be formed of U-shaped section as shown or may be of circular section and may be plated and polished or enamelled to match or contrast with the metal of the lid 54, as desired.

Figure 6:
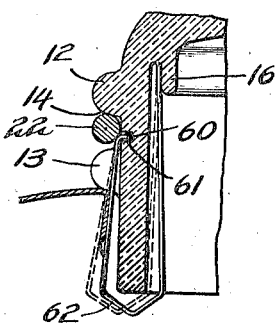
Figure 6 is a view similar to Figure 2 showing a modified form of clip.

In Figure 6 there is shown a top of substantially the same construction as that shown in Figure 3, that is, having a molding 13 which is cut away to receive the retaining clip. The bottom of the groove 14 in this top is provided with a pocket 60 into which the end 61 of the clip is registered. The clip extends downwardly between the adjacent ends of the molding 13 and around the end of the apron and thence upwardly into engagement with the shoulder 16 as before. The clip is provided with an inclined face 62 which serves as an aid in registering the top with the lid as before. Molding 13 may be omitted in the modification if desired.

Figure 6 also shows, in dotted lines, the position assumed by the spring clip when the top is not in engagement with a lid. The tension put in the spring clip forces the same outwardly, the inner and longer portion resting against the inner surface of the apron. Since both ends of the clip are anchored, as hereinbefore explained, the clip must be bent against its own tension as it is moved from the dotted to the full line position shown in the figure. It will be understood that the clips shown in Figures 2, 3 and 5 assume a similar position when not in engagement with a top.

From the foregoing it will be seen that the clips may be strongly tensioned outwardly, inasmuch as the inner end of the clips are securely anchored with respect to the top and held immovable thereon. The clips fulcrum in a groove in the top located at or above the lid and have sufficient resiliency to enable them to compensate for expansion and contraction of the top. The molding, bead and ring together form a relatively smooth surface and protect the end of the spring clip to prevent a tea towel from being caught in it.

Figures 8, 12:
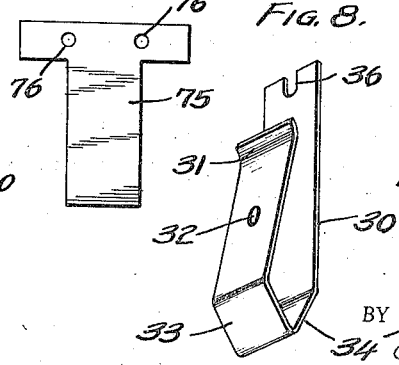
Figure 8 is a perspective view of a clip of the type shown in Figure 3.
Figure 12 is a plan view of the retaining means of the type shown in Figures 9 to 11 inclusive.

The clips shown in the drawing are provided with outwardly extending bosses, such as 32, Figure 8, which engage the lid to assist in holding the top thereon. These bosses may be omitted if desired. The tension that may be put in the spring clips is sufficient to securely hold the top on the lid without the aid of the bosses.

Figure 9:
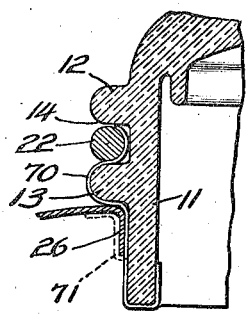
Figure 9 is a view similar to Figure 2 showing a different form of retaining means or clip.

In the embodiment of the invention shown in the Figures 9 to 12 inclusive, the clip for retaining the top upon the lid is formed of a soft non-resilient member adapted to be deformed to secure the top on the lid and to prevent its removal therefrom without reshaping the retaining clip. In Figure 9, the non-resilient metallic strap 70 terminates in a groove 14 formed between the bead 12 and molding 13 of the top and is retained thereon by a metallic ring as before. The strap 70 extends around the molding 13 and is disposed between the flange of the top 26 and the apron 11. The strap extends around the open end of the apron and into the hollowed out portion thereof to facilitate registering the top with the lid. After the top has been pushed in the lid, and turned to lock the usual bayonet joints, if such are provided, the strap 70 is bent outwardly into the position shown in dotted lines at 71 and serves to lock the top upon the lid. Since the strap is composed of soft metal, it can be readily tucked in place with a kitchen knife or other blunt tool. In order to remove the top, it is necessary to straighten out the strap 71 so as to permit it to slide between the top and the flange of the lid.

Figure 11:
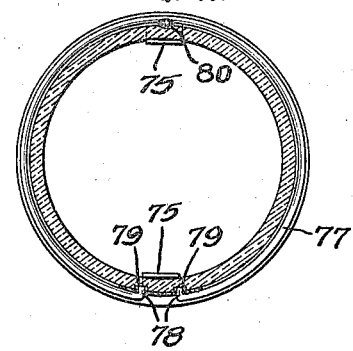
Figure 11 is a cross-sectional view of Figure 10 taken substantially along the lines of 11—11 looking in the direction of the arrows.
Figure 10:
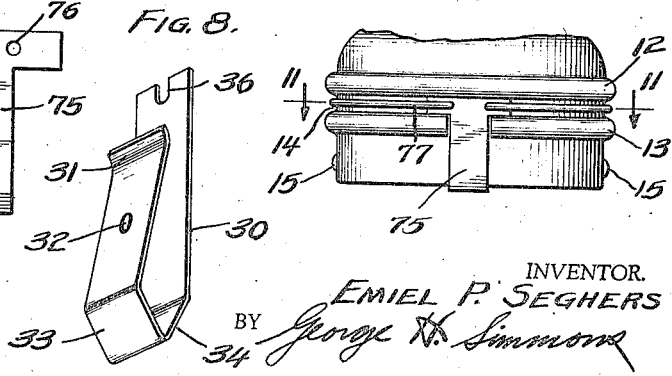
Figure 10 is a fragmentary elevational view of a top showing the application of a retaining means of the type shown in Figure 9.

In the embodiment shown in Figures 10, 11 and 12 the molding 13 of the top is cut away and a T-shaped strap 75 is used. The head portion of the strap is disposed in the groove 14 in the top and is perforated at 76. A ring 77 is disposed in the groove and is provided with hook-like ends 78 which extend through the perforation in the strap and into pockets 79 formed within the apron at the bottom of the groove. The pockets are larger than the hook-like ends 78 of the ring so that these ends may move as the top expands and contracts without unduly stressing the top.

In Figure 11, two retaining straps 75 are shown, both of which may be of the type shown in Figure 12 or, if desired, one may be of the type shown in Figure 9 and having a portion encircling the molding. The lugs 15 shown in Figure 10 may be used in conjunction with a retaining strap of this type or may be omitted as desired. Figure 11 also shows a recess in the apron located diametrically opposite the pockets 79 and into which extends an ear 80 on the ring 77. The strap 75, being deformable, is pressed into the recess by the ear, and is thereby secured to the top. The engagement of the ear with the strap and recess serves to hold that portion of the ring fixed with respect to the apron.

As shown in Figures 10 and 11, ring 77 is smaller than the space it occupies between the bead 12 and molding 13. The diameter of ring 77 may be substantially the same as ring 22, within the teachings of the invention, and I am not to be limited by the specific showing made in Figure 10 for the purpose of clearness. If desired, molding 13 can be omitted and ring 77 engaged with the lid to position the top with respect thereto.

Throughout the drawing and specification the molding and beads are shown as projecting outwardly from the surface of the top. This is not essential within the teachings of the invention, nor do the moldings and beads have to be of exactly the shape shown by way of example. Moldings and beads are used to define the groove that encircles the top, and obviously, if desired, the groove may be cast below the surface of the top, somewhat in the manner of the top shown in Figure 4, or the top may be shaped so as to eliminate the bead as a rim outstanding from the surface of the top.

From the foregoing it will be seen that the improved top with its encircling groove may be used either in conjunction with a resilient spring clip or in conjunction with a non-resilient deformable strap to securely bind the top upon the lid, and that bayonet lugs may be used in conjunction with either form of fastener if desired. Many modifications and adaptations may be made by one skilled in the art within the teachings of the invention.

Having thus complied with the statute and shown my invention by describing a preferred embodiment of it, what I consider new and desire to have protected by Letters Patent is pointed out in the appended claims.

What is claimed is:

1. A percolator top having the usual bead and a depending apron below the bead for engagement with a lid, a clip adapted to be carried by the exterior apron part of the top and passing around the bottom edge and into the interior of said top and means engaging both ends of the clip for securing said clip to said apron part.

2. The combination with a percolator top having a hollowed out portion opening into one end of the top, a bead projecting outwardly from the top, a projection extending downwardly within the hollowed out portion and toward the open end of the top to form a groove, of a spring clip extending from the bead around the open end of the top and having its end in engagement with said groove, the clip being tensioned to hold the top on a lid.

3. The combination with a percolator top having a hollowed out portion, a depression in the exterior wall thereof, an annular projection extending downwardly within the hollowed portion to form a groove, a spring clip extending from the depression around the open end of the top and into engagement with said groove, the clip being tensioned to hold the top on a lid, and means disposed in said depression and encircling the top for holding the clip on the top.

4. In combination a percolator top having a hollowed out portion opening into one end thereof, an apron portion, a depth limiting means projecting outwardly from the top to limit movement of the apron in a cover, a projection extending into the hollowed out portion to form a groove therein, and a spring clip extending from the depth limiting means around the open end of the top and into said hollowed out portion, said clip terminating in the groove, and being tensioned to hold the top on a lid.

5. In combination a percolator top having a hollowed out portion opening into one end thereof, a bead projecting outwardly from the top, a spring clip extending from above the bead around the bead and into open end of the top, and means within the hollowed out portion under which the inner end of said clip engages to tension the clip to hold the top on a lid.

6. In combination a percolator top having a hollowed out portion opening into one end thereof a bead projecting outwardly from the top, an annular projection extending downwardly within the hollowed out portion to form a groove, a a spring clip extending from above said bead around the bead and the open end of the top and into said groove, the clip being tensioned to hold the top on a lid, and means for securing said clip from accidental displacement.

7. A percolator top having a cylindrical portion, a hollowed out portion, an exterior clip holding means carried by the cylindrical portion, a clip extending from the exterior holding means beneath the top and into the hollowed out portion, and means for securing the exterior part of the clip holding means against accidental displacement.

8. An article of manufacture, a percolator top having a hollowed out portion, a bead projecting outwardly from the top, and a generally U-shaped spring clip extending from said bead around the free end of the cylindrical section and into the top means engaging both ends of said clip for holding the same on the top and for tensioning the clip to exert pressure outwardly from the top, and means for securing the bead engaging part of said clip to prevent accidental displacement.

9. An article of manufacture, a percolator top having a hollowed out portion, a bead projecting outwardly from the top, and a generally U-shaped spring clip extending from said bead around the free end of the cylindrical section and into the top, means forming a groove in said hollowed out portion against which the end of said clip abuts to tension the same to exert pressure outwardly from the top, and metallic means for securing the bead engaging part of the clip to prevent accidental displacement.

10. A percolator top having a cylindrical wall portion for engagement with a lid, a resilient clip adapted to be carried by the exterior part of said wall and passing around the bottom edge and into the interior of said wall, and means within said top to receive the end of the clip for releasably holding the end of said clip, said means restricting the depth the clip may enter into said top.

11. A percolator top having a hollowed out portion, a separate downwardly extending flange extending into the hollowed out portion and forming a groove between the wall of said top and the downwardly extending flange for reception of a clip.

12. A percolator top having a hollowed out portion, an apron portion and a downwardly extending wall formed within said top, spaced from said apron and forming with the body of the top a groove for the reception of a clip.

13. A percolator top having a hollowed out portion, a separate downwardly extending flange extending into the hollowed out portion, and forming a groove between the wall of said top and the downwardly extending flange for reception of a clip, said groove having a raised portion therein to resist sliding of said clip with respect to the top.

14. A percolator top having a hollowed out portion, an apron portion and a downwardly extending wall formed within said top, spaced from said apron and forming with the body of the top a groove for the reception of a clip, said groove having a raised portion therein to resist sliding of said clip in said groove.

15. In combination, a percolator top having a hollowed out portion, an apron portion, a depth limiting means projecting outwardly from the top to limit movement of the apron in a cover, a groove formed in the top within the hollowed out portion, and a spring clip extending from the depth limiting means around the open end of the top and into said hollowed out portion, said clip terminating in the groove and being tensioned to hold the top on a lid.

16. The combination with a percolator top having a hollowed out portion, a depression in the exterior wall thereof, a groove formed within the hollowed out portion, a spring clip extending from the depression around the open end of the top and into engagement with said groove, the clip being tensioned to hold the top on a lid, said groove restricting the depth the clip may enter into said top.

17. In combination, a percolator top having a hollowed out portion, an apron portion, a depth limiting means projecting outwardly from the top to limit movement of the apron in a cover, a grooved portion formed in the top within the hollowed out portion, and a spring clip extending from the depth limiting means around the open end of the top and into said hollowed out portion, said clip terminating in the groove and being tensioned to hold the top on a lid.

18. In combination, a percolator top having a hollowed out portion, an apron portion, a depth limiting means projecting outwardly from the top to limit movement of the apron in a cover, a groove formed in the top within the hollowed out portion, and a spring clip extending from the depth limiting means, around the open end of the top and into said hollowed out portion, said clip terminating in the groove and being tensioned to hold the top on a lid.

EMIEL P. SEGHERS.